United States Patent [19]

Skotheim et al.

[11] Patent Number: 4,571,029
[45] Date of Patent: Feb. 18, 1986

[54] ELECTRO-OPTICAL SWITCHING AND MEMORY DISPLAY DEVICE

[75] Inventors: Terje A. Skotheim, East Patchogue; William E. O'Grady, Center Moriches; Clovis A. Linkous, Stony Brook, all of N.Y.

[73] Assignee: The United States of America as represented by the United States Department of Energy, Washington, D.C.

[21] Appl. No.: 566,757

[22] Filed: Dec. 29, 1983

[51] Int. Cl.$^4$ ............................................. G02F 1/01
[52] U.S. Cl. ................................................. 350/357
[58] Field of Search ................................... 350/357

[56] References Cited

U.S. PATENT DOCUMENTS

| | | | |
|---|---|---|---|
| 3,712,709 | 1/1973 | Kenworthy | 350/160 R |
| 4,184,751 | 1/1980 | Nicholson | 350/357 |
| 4,304,465 | 12/1981 | Diaz | 350/357 |
| 4,306,774 | 12/1981 | Nicholson | 350/357 |

FOREIGN PATENT DOCUMENTS 11327 1/1982 Japan ................................. 350/357

OTHER PUBLICATIONS

Okabayashi et al, "Electrochemical Doping with Meso-Tetrakis(4-sulphonatophenyl)-Porphyrincobalt of a Pyrolle Film Electrode", J. Chem. Soc., Chem. Commun., 1983.

Bull et al, "Polymer Films on Electrodes", Manuscript Submitted to Electrochemical Society, Feb. 22, 1983.

*Primary Examiner*—Norman Morgenstern
*Attorney, Agent, or Firm*—Vale P. Myles; James W. Weinberger; Judson R. Hightower

[57] ABSTRACT

An electro-optical display device having a housing with wall means including one transparent wall and at least one other wall. Counter electrodes are positioned on the transparent wall and display electrodes are positioned on the other wall with both electrodes in electrically conductive relationship with an electrolyte. Circuit means are connected to the display and counter electrodes to apply different predetermined control potentials between them. The display electrodes are covered with a thin electrically conductive polymer film that is characterized according to the invention by having embedded in it pigment molecules as counter ions. The display device is operable to be switched to a plurality of different visual color states at an exceptionally rapid switching rate while each of the color states is characterized by possessing good color intensity and definition.

12 Claims, 1 Drawing Figure

ELECTRO-OPTICAL SWITCHING AND MEMORY DISPLAY DEVICE

The U.S. Government has rights in this invention pursuant to Contract Number DE-AC02-76CH00016, between the U.S. Department of Energy and Associated Universities, Inc.

BACKGROUND OF THE INVENTION

The invention relates to electro-optical display devices of the type that can be rapidly switched from one visual state to another and of the type that possesses inherent memory to retain the display in any of its various display states for either an indefinite period or a selectively terminable interval of time. More particularly, the invention relates to such a display device having an electrically conductive polymer film on the display electrode(s) thereof and having one or more types of pigment molecules embedded in the polymer film to provide a plurality of display colors that contrast sharply with the background of the display area in the device and that can be very rapidly switched from one color to another.

Electrochromic display devices of various types are generally well known and have come into extensive use in products such as digital display watches and video game display panels. Typically, the display effect in such devices is achieved by changing the electric potential of a display electrode relative to a counter electrode in the device to cause a film on the display electrode to electrochemically change color. Such electrochromic display devices are superior to either the types of light emitting diode or plasma display panels that preceded them in development, because they require substantially less power to achieve the display function. While liquid crystal display devices have been developed with lower power requirements than those of light emitting diode or plasma display panels, they have other inherent disadvantages. For example, the visual effect achievable from liquid crystals is severely limited by the viewing angle, i.e. if viewed from an angle several degrees away from an axis orthogonal to the plane of the display surface the visibility of the display is significantly decreased. Also, liquid crystal displays have essentially no residual memory function within the liquid crystal materials.

In the earliest electrochromic display devices, a color change was typically effected between a single dark color and a white or yellowish color, but no other variations in color were available. Changes in color display states in those early devices were caused by a redox reaction that was controllably triggered responsive to the passage of an electric charge between the display and counter electrodes when electric potential was switched in the devices. Such electrode deposition mechanisms were relatively slow in both the write and erase modes and a significant amount of power was required to achieve them. The relatively long time of visual display transition, or switching time, and the power requirements of those early electrochromic display devices both served to limit their application, particularly where batteries were needed as a power source for the display.

Many of the disadvantages inherent in the earlier electrochromic display devices have been overcome by the development of display devices that utilize metal diphthalocyanine complexes as the active electrochromic material in the display cells. By the use of such complexes, the display switching times have been improved to effect color changes in less than 50 milliseconds, versus the 0.1 second switching times typically required for the earlier generation of display devices that used a redox reaction requiring the passage of a charge through an electrolyte to a display electrode. Also, the use of such complexes has resulted in the production of multi-color displays which are readily obtainable by applying a range of selected voltages across the display and counter electrodes of an electrochromic display cell having a certain kind of metal diphthalocyanine film covering its display electrode. Examples of such relatively recently developed electrochromic display devices are discussed in U.S. Pat. No. 4,184,751, which issued on Jan. 22, 1980. The display devices disclosed in that patent are characterized by utilization of an electrochromic film formed of a selected diphthalocyanine complex that is preferably deposited in a continuous layer over the display electrodes in the device and also over the nonconducting, electrode-free, regions between the display electrodes. However, the patent does suggest that it is possible as an alternative form, to deposit the electrochromic film in separate segments so that the areas between the display electrodes are not covered by the film. The observed advantage of using such separate segments of the electrochromic film is that visual distraction caused by retention of the original film color in the regions between the display electrodes when the display state is switched, is minimized. The thickness of the diphthalocyanine films used in the types of electrochromic displays disclosed in the aforementioned patent are typically in the range of 0.2 to 1.0 micron, with the thicker films being used to intensify the color produced by the displays. Such relatively thin films have made it possible to attain switching times of less than 50 milliseconds for display areas on the order of five square centimeters. Of course, it remains desirable, for many visual display applications, to seek further significant improvements of the switching time for display cells.

It is also known that the useful life of an electrochromic display device utilizing diphthalocyanine film can be increased by incorporating into the film, after it is vacuum deposited on a display electrode, a transparent porous binder such as cellulose nitrate or a suitable polycarbonate resin. The binder may be applied by contacting the electrochromic film with a solution of the binder in an organic solvent such as methyl isolbutyl ketone. It would appear that such life protecting resin binders may have some disadvantageous side effects. For example, the binder increases the overall electrochromic film thickness, and thereby possibly increases the switching time of the device from one display state to a second state. There is a recognized correlation between film thickness and visual display switching speed, just as there is a recognized correlation between color contrast or intensity resulting from variation of thickness of the film on the display electrode.

In another prior art patent; U.S. Pat. No. 4,304,465, which issued Dec. 8, 1981, such design parameters are discussed in connection with the disclosure in that patent of an electrochromic display device having a polymer film disposed on its display electrodes to afford visual write and erase functions as a consequence of redox reactions being caused by the controlled passage of an electric charge between a display electrode and a counter electrode within the device. The polymer film used in that disclosed display device is described as being between 0.01 micron to 5 microns thick, with a preferred thickness for the film being 0.05 to 1 micron. In operation of the device the polymer film is oxidized to a colored state to effect a writing step, and then is reduced to a neutral or transparent form to effect an erasing step. Suitable polymers for practicing the invention disclosed in that patent are polyaniline, polypyrrole, and polynaphthylamine. Also, structurally modified substituents of the repeating monomer are said to be suitable for such films; for example, a suitable modified polypyrrole film would be N-phenyl polypyrrole or N-methyl polypyrrole, as disclosed in the patent. Although such polymer films are believed to have desirably long life expectancies, their applications in visual display devices are limited in several important respects. The switching times of such polymer film electrochromic display devices are typically within 0.1 second, which is too slow for many desired display applications. Moreover, such electrochromic polymer film display devices are only capable of being switched between two display states, i.e., a non-transparent or colored state and a transparent state. Thus, there appears to be no possibility of obtaining a range of different colors in a display utilizing only such types of polymer films as those disclosed in that patent. In addition, the color intensity and demarcation between the display colors and backgrounds in the two display states achieved with such polymer film covered display electrodes is often not as pronounced as desired for many display applications.

OBJECTS OF THE INVENTION

A primary object of this invention is to provide an improved electro-optical display device that overcomes the above-noted disadvantages and shortcomings of prior art electrochromic display devices.

Another object of the invention is to provide an electro-optical display device that has a faster visual state switching capability and a better intensity of color display than is attainable with known prior art electrochromic display devices.

A further object of the invention is to provide an electro-optical display device that utilizes an electrically conductive polymer film that incorporates embedded pigment molecules as counter ions, so the display device is operable to rapidly switch from one color display state to another without being time limited by requiring a migration of electrically charged material from the display electrode to a counter electrode in the device.

A still further object of the invention is to provide an electro-optical display device that is capable of switching to a plurality of different color states as a function of changes in electrical potential between the display electrode and a counter electrode in the device; with such switching operations being effected more rapidly than is known to be possible with prior art electrochromic display devices.

Additional objects and advantages of the invention will become apparent to those skilled in the art from the description of it that follows considered in conjunction with the accompanying drawing.

SUMMARY OF THE INVENTION

In one preferred form of the present invention an electro-optical display device that is rapidly switchable between two or more different color states, and that is possessed with a memory in each of the color states, is formed by coating the display electrode(s) in the device with a thin film of an electrically conductive polymer that has embedded in it selected pigment molecules as counter ions of the polymer matrix. The electrically conductive polymer film desirably increases the display state switching speed of the display device by interacting with the pigment molecules selected for incorporation in the polymer film. The pigment molecules in the film also afford the capability of switching the display into a plurality of different color states as a function of controlled electric potential changes between the display and counter electrodes of the device. Due to a combination of exceptionally thin polymer film thickness, in the range of 0.01 to 0.2 micron, and the embedded pigment molecules therein, the device can be switched from one color state to another of equal color intensity in shorter switching times than is known to be possible with prior art electrochromic display devices. Moreover, better color contrast than known heretofore is achievable in electrically conductive polymer films of a given thickness, because it has been found that unexpectedly high proportions of pigment to polymer can be used in such matrixes when they are made according to the novel aspects of the present invention.

DESCRIPTION OF THE PREFERRED EMBODIMENTS

Figure 1:
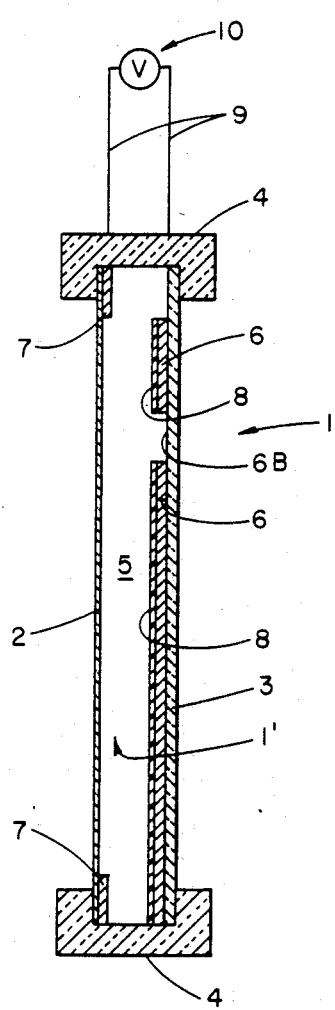
FIG. 1 is a schematic, cross-sectional view from one side of an electro-optical display device which is constructed according to the invention and is shown in combination with circuit leads for connecting the display device to a color-switching control that is shown simply as a variable voltage source. The display device illustrated in the drawing does not illustrate either the component parts or their relationship to one another, to true scale.

FIG. 1 shows schematically a preferred embodiment of the invention in the form of an electro-optical display device 1 in which the various components and their spacing are not depicted to scale. The display device includes suitable conventional wall means that form a housing for the display electrode means, counter electrode means, electrolyte and other components of the invention, all of which are described herein. In this form of the invention the wall means includes a transparent wall 2 and a generally parallel second wall 3. Both walls are formed of glass but may be made of other suitable conventional panel material. Of course, the second wall 3 need not be transparent, particularly if the display is of the reflective type, because in normal operation of such a reflective display device 1 the operator will view the electro-optical display only through the transparent wall 2. The wall means further includes a channel shaped peripheral wall section 4 which can be formed of a suitable sealing glass or ceramic or other conventional means for holding the transparent wall 2 and the other wall 3 in their desired parallel relationship while hermetically sealing the interior of the housing 1 so that it can retain a liquid electrolyte 5, which is disposed within the housing between the transparent wall 2 and the other wall 3. A suitable display electrode means 6 is positioned on the inner side of the other wall 3 in a generally continuous layer, as shown, except for the one break 6B depicted therein, in FIG. 1. Counter electrode means 7 are positioned on the inner side of the transparent wall 2, preferably, as shown, to the sides of the main viewing area of transparent wall or window 2, and the electrolyte 5 is held in electrically conductive relationship with both the counter electrode means and an electrically conductive polymer film 8 disposed over the display electrode means 6. If it is desired to more uniformly distribute the counter electrode means 7, either a continuous film of a suitable transparent electrode material, such as indium-tin-oxide on glass, or a grid of separated electrically conductive sections of similar transparent conductive material can be disposed on the inner side of wall 2 over the main viewing area thereof.

Except for the electrically conductive polymer film 8, the component parts of the display device 1 described thus far may all be formed of generally well known material for making such parts, and can be formed in suitable conventional manner, such as those described respectively in the two above-identified patents for forming like components in somewhat related types of electrochromic display devices. Accordingly, the teachings of those two patents (Pat. Nos. 4,184,751 and 4,304,465) and the disclosure references incorporated therein are incorporated herein by reference for their teaching of such relatively conventional panel construction components and methods of assembly.

While the display electrode 6 is shown as a nearly continuous film in this embodiment, it will be recognized that, it can be formed as a plurality of discrete electrodes having nonconductive areas between them on the wall 3. For example, a plurality of separate dots of gold can be vapor-deposited onto the wall 3 to form such discrete electrodes. In the event that discrete display electrode elements are utilized, the electrically conductive polymer film 8, that is a characteristic part of the present invention, may also be made in discrete sections, each of which are disposed respectively over one of the discrete display electrodes. In such an arrangement, the visual blurring that often occurs due to voltage gradients between display electrodes that are not sufficently insulated from each other, is significantly minimized for the reasons explained above in the Background portion of this specification.

In the form of the invention, shown in FIG. 1, the display electrode means 6 is a single layer of generally uniform thickness in the range of one to two mils of a suitable electrically conductive material, such as vapor-deposited gold. A continuous layer of electrically conductive polymer film 8 is formed on the display electrode means, to have a generally uniform thickness in the range of 0.01 to 1 micron, according to the invention. The use of such a thin film is possible, while providing desirable levels of color intensity and contrast, because the particular pigments desribed herein for practicing the invention have absorption constants that are higher by almost an order of magnitude than those of polymers used in prior art display devices. A number of different suitable generally well known electrically conductive polymers can be used to form the polymer film 8. In the preferred embodiment shown in FIG. 1, the polymer film is polypyrrole, but in alternative forms of the invention the electrically conductive polymer film 8 can be any polymer selected from a group consisting of polypyrrole, poly(N-phenyl pyrrole), poly(N-methyl pyrrole), polyaniline, polythiophene, polybithiophene, polyfuran, and polyazulene.

In accordance with a characterizing feature of the present invention, the polymer film 8 is made as a matrix that incorporates pigment molecules embedded in it as counter ions. The pigment molecules in the preferred embodiment of the invention described with reference to FIG. 1 are tetrasulfonated cobalt phthalocyanine, but in alternative embodiments of the invention other suitable pigment molecules may be used. For example, to make devices having approximately equivalent switching times, the embedded pigment molecules in the matrix can all be selected to be of essentially one metal phthalocyanine (PC) which is selected from the group consisting of tetrasulfonated cobalt PC, copper PC and iron PC. Furthermore, the embedded pigment molecules may all be essentially one of the rare earth diphthalocyanines (diPC) selected from the group consisting of scandium diPC and lutetium diPC.

We have also found that it is possible to produce display devices having better color contrast for a given thickness of polymer-pigment matrix than has been known heretofore by employing a monosulfonated PC species, instead of using the tetrasulfonated PC described above. The second example described below explains some of the surprising results we discovered when using monosulfonated cobalt PC pigment molecules in the matrix of conductive polymer film 8. At this point it should be understood that with such a form of the invention it is possible to produce display devices that produce sigificantly better color contrast for a given thickness of polymer-pigment matrix film, or that make it possible to use thinner films with resultant faster color switching times for given levels of color contrast, than has previously been known to be possible. Accordingly, in such an alternative preferred embodiment of the invention, the polymer film 8 described above with reference to FIG. 1 would have embedded in it pigment molecules of monosulfonated CoPC.

To make the display device 1 capable of providing multi-colored displays, a variety of different pigment molecules can be embedded in the electrically conductive polymer 8. In such an embodiment of the invention, which is desired to produce two different characteristic display colors, a first portion of the embedded pigment molecules are all made essentially of a first type of metal phthalocyanine (PC) selected from the group consisting of monosulfonated cobalt PC, tetrasulfonated cobalt PC, copper PC and iron PC; and a second portion of the embedded pigment molecules are all made of a second type of different metal PC selected from that group. In such a display device the color of the polymer film 8 is changeable to a plurality of different colors, respectively, responsive to the electric potential applied to display electrode means 6 and counter electrode means 7 being changed to different predetermined voltages relative to the voltage of the display electrode means 6. Alternatively, by using a single selected type of certain pigment molecules, and by applying different predetermined voltage levels across the counter electrode and display electrode means, it is also possible to achieve a multi-color display. For example, if the embedded pigment molecules are all lutetium diphthalocyanine six different color states can be achieved in the polymer film (8) by changing the potential across the film relative to the potential of the display electrode means as follows: at $-1.2$ volts a lavender color display state is achieved; at $-1.0$ volts a blue color state is attained; at $-0.8$ volts a turquoise color state is obtained; at $-0.3$ volts a green color state is attained; at $+0.7$ volts a tan color state is attained; at $+1.0$ volts a red color state is attained in the polymer film of the display device.

Any of a variety of suitable conventional control means can be used to effect such desired switching of the display electrode means 6 to achieve the different visual display states. For example, see the control means shown in the first U.S. patent referred to above. Likewise, suitable conventional means can be used to edge-connect the display electrode means 6 and the counter electrode means 7 to such a control circuit. For purposes of describing the operation of the preferred embodiment of the invention shown in FIG. 1, it need only be understood that the display electrode means 6 and the counter electrode means 7 are suitably adapted to have electric circuit means 9 connected to them. For selectively varying the electric potential that is applied by the circuit means a variable source of direct current voltage 10 is shown connected to the circuit conductor 9, across the electrolyte 5 and the electrically conductive polymer film 8 to make the display device 1 operable to electronically change the pigment molecules embedded in the polymer film 8. Such changes are responsive to predetermined variations in the electric potential that is applied across the film to selectively change the color of the film as it is seen through the transparent wall 2. In the preferred embodiment of the invention shown in FIG. 1, the voltage control means 10 connected to the electric circuit means 9 need only be effective to switch the potential across the polymer film 8 sufficiently to effect a color change. In an example where the polymer matrix film is blue as made and the color switching occurs around zero volts as measured with respect to a reference electrode (which might be a conventional saturated calomel electrode disposed in the type of device shown in FIG. 1, in place of the small separate portion of electrode means (6) such switching to a pale yellow display state occurs when a negative voltage of 0.5 volts is applied to electrode means 6 relative to the calomel reference electrode. Thus, in the form of the invention shown in FIG. 1, by applying a voltage between +0.5 volts and −0.5 volts relative to the potential of the electrolyte 5, it is possible to effect the desired color changes in the polymer matrix of tetrasulfonated cobalt PC pigment counter ions.

In embodiments of the invention that employ a plurality of different pigment molecules embedded in the polymer film 8, in order to provide a plurality of different color display states, the voltage control circuit 10 connected to the circuit means 9 need only be effective to provide a plurality of different predetermined voltage control levels across the polymer 8. For example, in an embodiment of the invention where a first portion of the pigment molecules embedded in the polymer film 8 are tetrasulfonated cobalt phthalocyanine and a second portion of the pigment molecules are copper phthalocyanine, the polymer film 8 can be made to display a pale yellow, or yellowish green color responsive to the potential across the film relative to the potential of the electrolyte 5 being made more negative than −0.3 volts. The film color state can be changed to a blue color responsive to that potential being made more positive than 0.0 volts, and the film color can be further changed to a purple color responsive to that same potential being made more positive than +0.8 volts.

In a further alternative embodiment of the invention in which it is desired to provide a plurality of distinct different colors with the display device 1, the embedded pigment molecules in the polymer film 8 comprise a plurality of approximately equal portions of at least three different types of molecules of either metal phthalocyanines (PC) or rare earth diphthalocyanines (diPC) taken, respectively, from the groups consisting of cobalt PC, copper PC, iron PC, scandium diPC and lutetium diPC. In such a polymer film and pigment molecule matrix, the visual state of the polymer film 8 is changed to a plurality of different colors corresponding to the different electric potentials at which the respective counter ions in the pigments are electronically changed responsive, respectively, to the potential applied from voltage source 10 by circuit means 9 being varied to a plurality of predetermined different voltages relative to the base voltage of the display electrode means 6.

In the preferred embodiment of the invention illustrated in FIG. 1 and in the alternative embodiments of the invention described above, the desirably rapid characteristic switching speed between the various visual display states of the polymer film 8 is achieved by making the polymer film 8 have a generally uniform thickness over the display electrode means 6 in the range of 0.01 to 0.2 microns. For the fastest switching times with optimum color intensity and contrast, the polymer film 8 with its embedded pigment molecules is made of generally uniform thickness in the range of 0.05 to 0.1 micron, which provides a switching time of less than 20 milliseconds for the film to change from one color state to another responsive to the occurrence of a predetermined variation in the applied potential across the film from the display electrode means 6 to the counter electrode means 7. The minimum switching time achievable with the very thin conductive polymer films used in practicing the invention have not been precisely measured, but it is believed switching of such films can be made to occur in the range of 1 to 5 milliseconds or better; particularly in devices where the polymer-pigment matrix of film 8 is made to include monosulfonated cobalt PC, which affords a desirably intense color contrast for an ultra-thin film

EXAMPLE I

In one demonstration example of a display device constructed according to the invention and having component parts generally similar to those depicted in FIG. 1, except that a more standard three electrode configuration was used wherein a reference electrode of saturated calomel (SCE) was positioned in contact with the electrolyte e.g., in lieu of the illustrated single separate portion of electrode means 6. The display electrode means 6 was made by covering the majority of the inner surface of wall 3 with a continuous film of indium-tin-oxide (ITO), and instead of being vapor-deposited gold, counter electrode 7 was a platinum wire. Of course, it is well known that in place of the continuous film of ITO a plurality of discrete separate indium tin oxide transparent electrodes could be deposited on a transparent glass base to form a suitable counter electrode means (7) while a layer of gold could be vapor-deposited as a plurality of discrete, spaced display electrodes on a parallel separate glass plate to form suitable display electrodes (6) in making such a display device. A polypyrrole film matrix having tetrasulfonated cobalt phthalocyanine (CoPCS) pigment molecules embedded in it as counter ions was synthesized from aqueous solution in the demonstration three electrode cell; the display electrode means (6) was kept at 0.75 volts versus the SCE. The electrochemical synthesis occurred from a solution containing 0.001 molar CoPCS and 0.1 molar pyrrole monomer. The CoPCS was in the form of a sodium salt, and was dissolved in distilled and purified water. As thus formed, the polymer film with embedded pigment molecules was dark blue and changed to a pale yellow or yellowish green color when reduced at a voltage more negative than −0.3 volts versus the potential of the reference SCE.

The switching speed of the polymer film from one visual display state to another appeared to be substantially faster than 20 milliseconds and the color of the film reverted back to the original blue color at an equal switching speed upon reversing of the voltage to more positive than 0.0 volts versus SCE. The thickness of the polymer film (8) was in the range of 0.05 microns to less than 0.1 microns and the display device was switched more than $10^5$ times from one visual state to another by selectively applying switching voltages between +0.5 volts and −0.5 volts relative to the SCE; thus a voltage change of 1.0 volts across the cell was effected. The display electrode and counter electrode were both in contact with an electrolyte of acetonitrile solution that contained 0.1 molar tetraethylammonium tetrafluroborate that was kept under one atmosphere of nitrogen. No apparent loss in color intensity or definition was observed in the display states of the polymer film (8) between its initial switching operations and those occurring at the end of the demonstration.

Although maximum switching speed for the demonstration device was not precisely determined, it is believed that the switching speed to change the display states of the film (8) from one color state to another was substantially less than 20 milliseconds. The measurements taken showed that switching speeds of at least 20 milliseconds between display states is achieved with the invention. Because the switching process in the display devices constructed according to the invention is electronic, it does not require movement of counter ions in and out of the polymer film and pigment matrix, in a manner similar to the switching processes used in prior art electrochromic displays such as the redox display devices disclosed in the above mentioned U.S. Pat. No. 4,304,465.

EXAMPLE II

In a second demonstration example, which was performed with the same type of three electrode device configuration that was used in Example I, above; instead of using tetrasulfonated PC for the pigment ions, monosulfonated cobalt PC was synthesized. Since a given number of counter-charges are required in the polymer-pigment matrix of the film (8) in order to achieve charge neutrality, it would seem that for a given polymer, such as the polypyrrole used in the example demonstration, one would develop a matrix having four times as many molecules of monosulfonated CoPC (which has only one counter ion) as the number of tetrasulfonated CoPC (which has four negative charges—one for each $SO_3$ group) used to neutralize an equivalent percent by weight of the polymer. Surprisingly, when the content of phthalocyanine was measured in the monosulfonated CoPC polymer matrix it was found that five times (rather than 4 time) as much phthalocyanine was present in the matrix as had been measured in the polymer-pigment film matrix made with tetrasulfonated CoPC, per Example I. This discovery is significant, because it means that in practicing the invention, using monosonfulated CoPC, it is possible to put four to five times as much pigment into a polymer-pigment film matrix, thereby to achieve an even better color contrast for a given film thickness, than is achievable with pigments having four charges per molecule, such as the tetrasulfonated CoPC. Alternatively, thinner and faster switching films can be used to produce a given desired color contrast.

From the foregoing description it will be apparent to those skilled in the art that various further modifications and alternative embodiments of the invention can be practiced without departing from the true scope of the invention; accordingly, it is our intention to encompass the true scope of the invention within the following claims.

We claim:
1. An electro-optical display device comprising;
    wall means defining a housing, said wall means including a transparent wall and at least one other wall,
    display electrode means positioned on the inner side of said other wall,
    counter electrode means positioned on the inner side of said transparent wall,
    a thin electrically conductive polymer film incorporating pigment molecules embedded therein as counter ions, said film being disposed over the display electrode means,
    an electrolyte disposed within said housing and in conductive relationship with said counter electrode means and said film over the display electrode means,
    said display electrode means and said counter electrode means being adapted to have electric circuit means connected to them for selectively varying the electric potential applied by them across the electrolyte and the polymer film,
    said device being operable to electronically and rapidly change said pigment molecules embedded in the polymer film, responsive to predetermined variations in the electric potential applied across said film, thereby to selectively quickly change the color of said film as it is seen through said transparent wall.
2. An invention as defined in claim 1, wherein said polymer film has a generally uniform thickness over said display electrode means in the range of 0.01 to 1.0 micron.
3. An invention as defined in claim 2, wherein the generally uniform thickness of said film is in the range of 0.05 to 0.1 micron, and whereby the time required for the film to change color responsive to the occurrence of said predetermined variation in applied potential is less than 20 milliseconds.
4. An invention as described in claim 1, wherein said display electrode means comprises a plurality of discrete display electrodes, and said thin polymer film comprises a plurality of discrete sections each disposed respectively over one of said discrete display electrodes, said discrete sections of film being spaced from one another to prevent visual blurring between them.
5. An invention as defined in claim 1, wherein said display electrode means comprises a layer of electrically conductive material, and wherein said electrically conductive polymer film forms a continuous layer of film over said display electrode, said continuous layer of film having a generally uniform thickness in the range of 0.01 and 1.0 micron.
6. An invention as defined in claim 1, wherein said polymer film is polypyrrole, and wherein said embedded pigment molecules are tetrasulfonated cobalt phthalocyanine, whereby the film is changed to a blue color responsive to said applied potential being made more positive than 0.0 volts relative to the electrolyte, and the film is changed to a pale yellow or yellowish green color responsive to said applied potential being made more negative than −0.3 volts relative to said electrolyte.

7. An invention as defined in claim 1, wherein said polymer film is selected from the group consisting of polypyrrole, poly(N-phenyl pyrrole), poly(N-methyl pyrrole) polyaniline, polythiophene, polybithiophene, polyfuran and polyazulene.

8. An invention as defined in claim 7, wherein said embedded pigment molecules are essentially all of one metal phthalocyanine (PC) selected from the group consisting of: monosulfonated cobalt PC, tetrasulfonated cobalt PC, copper PC, and iron PC.

9. An invention as defined in claim 7, wherein said embedded pigment molecules are essentially all of one rare earth diphthalocyanine (diPC), selected from the group consisting of scandium diPC and lutetium diPC.

10. An invention as defined in claim 7, wherein about half of said embedded pigment molecules are of a first, and about half of said molecules are of a second metal phthalocyanine (PC), both halves being selected from the group consisting of monosulfonated cobalt PC, tetrasulfonated cobalt PC, copper PC and iron PC, whereby the color of said polymer film is changed to a plurality of different colors respectively, responsive to said applied potential being changed to different predetermined voltages relative to the voltage of said electrolyte.

11. An invention as defined in claim 7, wherein a first portion of said pigment molecules are tetrasulfonated cobalt phthalocyanine, and a second portion of said pigment molecules are copper PC, whereby the polymer film has a pale yellow or yellowish green color responsive to said applied potential being made more negative than −0.3 volts; the film color is changed to a blue color responsive to said potential being made more positive than 0.0 volts; and the film color is further changed to a purple color responsive to said potential being made more positive than 0.8 volts, all of said voltages being relative to the potential of said electrolyte.

12. An invention as defined in claim 7, wherein said embedded pigment molecules comprise a plurality of either metal phthalocyanines (PC) or rare earth diphthalocyanines (diPC) taken, respectively from the groups consisting of CoPC, CuPC, FePC, scandium diPC and lutetium diPC, whereby said polymer film is changed to a plurality of different colors corresponding to the potentials at which the different counter ions are electronically changed responsive respectively to said applied potential being varied to a plurality of predetermined different voltages relative to the base voltage of said display electrode means.

* * * * *